(12) United States Patent
Burada et al.

(10) Patent No.: US 8,895,888 B2
(45) Date of Patent: Nov. 25, 2014

(54) ANTI-SMUDGING, BETTER GRIPPING, BETTER SHELF-LIFE OF PRODUCTS AND SURFACES

(75) Inventors: Venkata Burada, West Chester, OH (US); Jainagesh Sekhar, Cincinnati, OH (US); Jerod Batt, Cincinnati, OH (US); Ganta S. Reddy, Hyderabad (IN); Brian Kandell, Cincinnati, OH (US)

(73) Assignee: Micropyretics Heaters International, Inc., Cincinnati, OH (US)

( * ) Notice: Subject to any disclaimer, the term of this patent is extended or adjusted under 35 U.S.C. 154(b) by 247 days.

(21) Appl. No.: 13/519,611

(22) PCT Filed: Sep. 20, 2010

(86) PCT No.: PCT/US2010/049421
§ 371 (c)(1),
(2), (4) Date: Jun. 28, 2012

(87) PCT Pub. No.: WO2011/096956
PCT Pub. Date: Aug. 11, 2011

(65) Prior Publication Data
US 2012/0298133 A1    Nov. 29, 2012

Related U.S. Application Data

(60) Provisional application No. 61/337,530, filed on Feb. 5, 2010, provisional application No. 61/338,866, filed on Feb. 25, 2010.

(51) Int. Cl.
*B23K 10/00* (2006.01)
*H05H 1/00* (2006.01)
*H05H 1/30* (2006.01)
*B08B 7/00* (2006.01)
*B29C 59/14* (2006.01)

(52) U.S. Cl.
CPC . *H05H 1/00* (2013.01); *H05H 1/30* (2013.01); *B08B 7/00* (2013.01); *B29C 59/14* (2013.01)
USPC ............. 219/121.5; 219/121.52; 219/121.48; 110/250

(58) Field of Classification Search
CPC ............. H05H 1/00; H05H 1/30; H05H 1/40; H05H 1/46; H05H 1/26
USPC ............... 219/121.5, 121.36, 121.48, 121.58; 110/346, 250, 237; 588/900
See application file for complete search history.

(56) References Cited

U.S. PATENT DOCUMENTS 3,648,015 A    3/1972   Fairbairn
4,555,609 A * 11/1985  Marhic et al. ............ 219/121.39

(Continued)

FOREIGN PATENT DOCUMENTS

WO    WO/2011/049698    4/2011
WO    WO2011096956     8/2011

OTHER PUBLICATIONS

"V. Rajamani, et al., Enhancement of Heat Transfer Due to Plasma Flow in Material Processing Applications, American Society of Mechanical Engineers, Heat Transfer Division, (Publication) HTD vol. 376 HTD, Issue 2, 2005, pp. 889-893".

(Continued)

Primary Examiner — Mark Paschall
(74) Attorney, Agent, or Firm — Michael C. Connelly

(57) ABSTRACT

A device to provide improved anti-smudging, better gripping and longer shelf-life to products and surfaces includes an electric superheated steam generator and an electric low-ion plasma generator to provide superheated steam and low-ion plasma to the surfaces of products including plastics. One embodiment envisions the superheated steam generator and the low-ion plasma generator being contained in a housing while another embodiment anticipates a conveyor means positioned in front of the superheated steam generator and the low-ion plasma generator. A method for the improving of anti-smudging, gripping and shelf-life for properties includes the application of superheated steam and low-ion plasma by means of a superheated steam generator and a low-ion plasma generator to products for specific periods of time and at specific distances to attain desired surface and bulk properties. The superheated steam and low-ion plasma may be applied individually, simultaneously or sequentially.

14 Claims, 8 Drawing Sheets

(56) References Cited

U.S. PATENT DOCUMENTS

Figure 1:
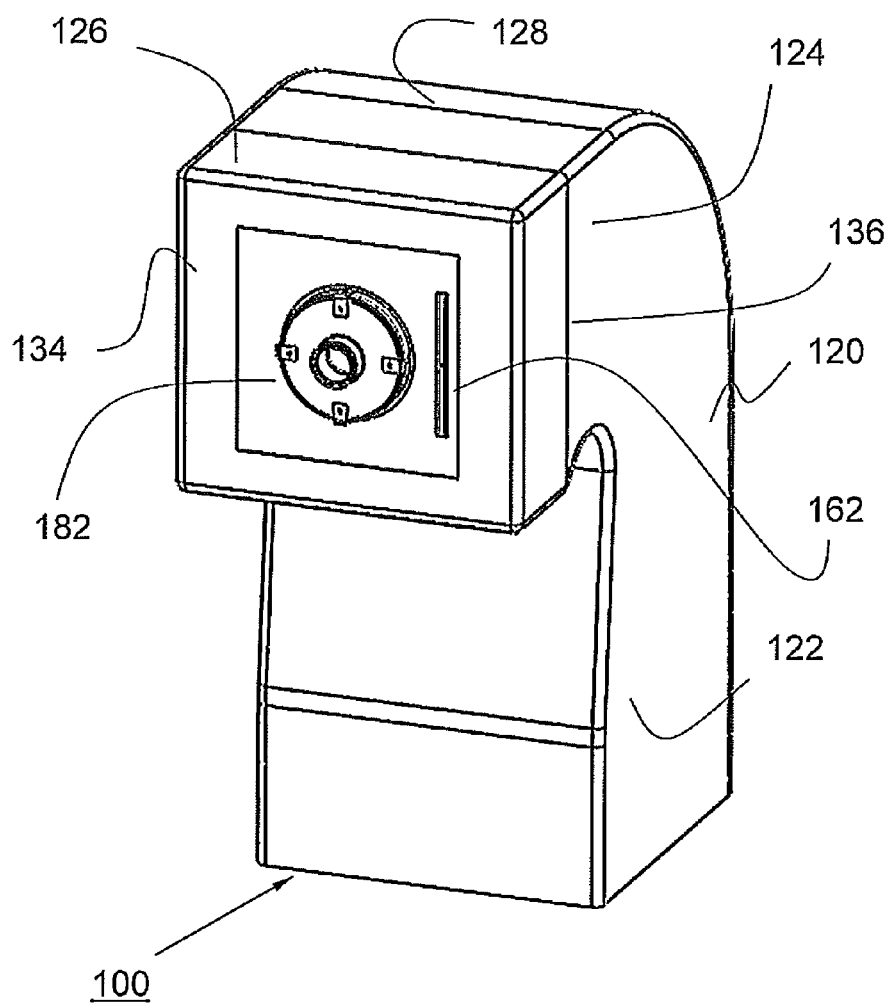

| | | | |
|---|---|---|---|
| 5,085,034 A | 2/1992 | Haas | |
| 5,387,842 A | 2/1995 | Roth | |
| 5,403,453 A | 4/1995 | Roth | |
| 5,414,324 A | 5/1995 | Roth | |
| 5,456,972 A * | 10/1995 | Roth et al. | 442/301 |
| 5,611,947 A * | 3/1997 | Vavruska | 219/121.52 |
| 5,669,583 A | 9/1997 | Roth | |
| 5,711,339 A | 1/1998 | Kurihara | |
| 5,762,009 A * | 6/1998 | Garrison et al. | 110/346 |
| 5,925,208 A | 7/1999 | Dronzek | |
| 5,938,854 A * | 8/1999 | Roth | 134/1 |
| 5,963,709 A | 10/1999 | Staples | |
| 6,013,333 A | 1/2000 | Carson | |
| 6,086,991 A | 7/2000 | Hubbard | |
| 6,146,724 A | 11/2000 | Roth | |
| 6,153,852 A * | 11/2000 | Blutke et al. | 219/121.59 |
| 6,245,132 B1 | 6/2001 | Feldman | |
| 6,513,435 B2 * | 2/2003 | Detzner | 101/487 |
| 6,616,786 B2 | 9/2003 | Blom | |
| 6,816,671 B1 * | 11/2004 | Reddy et al. | 392/485 |
| 6,880,491 B2 | 4/2005 | Reiner | |
| 6,900,421 B2 | 5/2005 | Varma | |
| 6,939,602 B2 | 9/2005 | McGee | |
| 6,991,261 B2 | 1/2006 | Dronzek | |
| 7,113,695 B2 | 9/2006 | Ono | |
| 7,115,845 B2 | 10/2006 | Nomura | |
| 2002/0006648 A1 * | 1/2002 | Goodman et al. | 435/173.1 |
| 2003/0138573 A1 * | 7/2003 | Mikhael et al. | 427/569 |
| 2006/0118242 A1 * | 6/2006 | Herbert et al. | 156/345.43 |
| 2007/0145038 A1 | 6/2007 | Vissa | |
| 2010/0129157 A1 | 5/2010 | Reddy | |

OTHER PUBLICATIONS

"V. Rajamani, et al., Heat-transfer enhancement using weakly ionized, atmospheric pressure plasma in metallurgical applications Metallurgical and Materials Transactions B: Process Metallurgy and Materials Processing Science vol. 37, Issue 4, Aug. 2006, pp. 565-570".

"International Application Serial No. PCT/US10/49421, Written Opinion" issued May 26, 2011, 3pgs.

"International Application Serial No. PCT/US10/49421, International Search report" issued May 26, 2011, 2 pgs.

* cited by examiner

ANTI-SMUDGING, BETTER GRIPPING, BETTER SHELF-LIFE OF PRODUCTS AND SURFACES

CROSS-REFERENCED TO RELATED APPLICATIONS

This application claims the benefit of PCT/US10/49421 filed on Sep. 20, 2010 and U.S. provisional application 61/338,866 filed on Feb. 25, 2010 and 61/337,530 filed on Feb. 5, 2010 by the applicants which are both incorporated by reference herein in their entireties.

BACKGROUND

1. Field

The present application relates to improved anti-smudging, gripping and shelf-life properties of products and surfaces through the use of low-ion plasma, superheated steam and gas system surface treatments as well as system combinations thereof.

2. Prior Art

There is currently a great need for bottles made of many materials, including plastics, for the containment and storage of consumer products. Plastic bottles often have labels on them which need to appear visually sharper and not smudge with use or age. Profitability is increased to a great extent when these conditions are achieved by making products more aesthetically pleasing and attractive as well as increasing the shelf-life of the bottle and its identifying label. Longer-lasting and visually sharper product labels allow older goods to stay on the shelf and remain for sale longer before replacement with fresher items. This would be especially important with non-perishable goods that, if marked with sharp and long-lasting labels, could be left on shelves indefinitely and still remain appealing and marketable to consumers. Older items, with still fresh-appearing labels, could be placed at the front of shelves and sold first. Costs associated with inventory and replacement of goods could thereby be substantially decreased.

Improvements in the physical properties of bottles are vital as well. Surface treatments are needed that can beneficially affect properties such as hardness, fatigue, creep, stickiness, gripability and the reactivity of a bottle's material. Often the transparency of a bottle is impaired by the presence of a wax or glue coating that is applied during processing. Methods are needed to remove the wax or glue without damaging labels if present; thereby making a surface that is matte, due to the presence of glue, transparent. Alternatively, a system is needed to create a matte finish, if desired, on bottles directly or in a manner that does not disturb labels, lettering or bar codes. Bottle or container surfaces often need to be cleaned before the application of labels as well.

Surface heat treatment using an open flame as the heat source is the present solution for the meeting of many of the above goals. Flame treatment is the current industry standard for surface cleaning of bottles prior to application of items such as chemical etch/photo etch/screened nameplates, pressure sensitive labels and decals, UID and mil-spec labeling, serialization and bar-code identification, specialty engravings, large-format digital and screen printing and specialty food and packaging labels. Flame is also required for heat transferred decals which may display abstract design elements resembling, for example, henna tattoo artwork. Flame curing is needed for labels, produced by DI-NA-CAL®- brand heat transfer labels, for example, which are formulated with a protective lacquer and, sometimes, a custom-designed adhesive print coat. Examples of methods and processes using flame to prepare and alter surfaces of bottles for application and/or preservation of labels and direct printing on a surface include U.S. Pat. No. 6,991,261 by Dronzek, Jr., et al., U.S. Pat. No. 6,939,602 by McGee, et al., U.S. Pat. No. 6,616,786 by Blom, et al., U.S. Pat. No. 6,513,435 by Detzner, U.S. Pat. No. 6,086,991 by Hubbard, et al., U.S. Pat. No. 5,925,208 and U.S. Pat. No. 5,711,839 by Dronzek, Jr., et al. and U.S. Pat. No. 5,085,034 by Haas.

As an alternative to open flame as a heat source, U.S. Pat. No. 6,013,333 by Carson, et al., and U.S. Pat. No. 6,086,991 by Hubbard, et al. suggest the use of plasma. This plasma, however, is not low-ion plasma, which can be defined as plasma with an ion percentage by volume of 2% or less. Upon application, ions in the plasma have been found to have a beneficial impact on surface properties. Plasma with low-ion content may be generated by the devices of U.S. Pat. No. 5,963,709 by Staples, et al. and U.S. Pat. No. 6,816,671 by Reddy, et al. Small amounts of thermal plasma may be created in very high temperature environments employing high temperature heating elements composed of materials such as molybdenum, tungsten and molybdenum disilicide materials. Plasma can also generated by RF means, as illustrated by U.S. Pat. No. 3,648,015 by Fairbairn, which relates to cold plasma, U.S. Pat. Nos. 5,403,453, 5,387,842, 5,414,324, 5,456,972 by Roth, et al., U.S. Pat. Nos. 5,669,583, 5,938,854, 6,146,724 by Roth and U.S. Pat. No. 6,245,132 by Feldman et al. Not all techniques can produce air plasma at normal pressures and not all techniques, except for U.S. Pat. Nos. 5,963,709 and 6,816,671, can be considered to produce substantial heat delivered simultaneously with hot gas. The plasma recombination leads to heat but only generally at a recombining surface.

Superheated steam, which is often used synonymously with saturated and super-saturated steam, although there may be some differences, may be generated in a number of ways for various purposes. U.S. Pat. No. 6,900,421 by Varma is directed to a sterilizing apparatus using microwave heating for the generation of superheated steam. U.S. Pat. No. 6,880,491 by Reiner, et al. concerns the generation of superheated steam using hydrogen peroxide and a combustible fluid, wherein the combustion process decomposes the hydrogen peroxide to produce superheated steam. U.S. Pat. No. 7,115,845 by Nomura, et al. consists of a superheated steam generator that uses electromagnetic induction to produce the superheated steam. Here, in one embodiment of the present application, the superheated steam generator may be comprised of a heater such as the coil-in-coil type disclosed in U.S. Publication No. 2007/0145038 by Vissa, et al., which overcomes problems associated with the relationship of Psat and Tsat. The heater may also be of the type disclosed in U.S. Publication No. 2010/129157 by Reddy, et al. In the present patent application, the use of superheated steam, alone or in conjunction with low-ion plasma has been shown to improve surface and bulk properties of products exposed to it.

When an open flame is applied directly to a bottle to remove glue and wax or to improve surface and bulk properties, a number of disadvantages are presented including:

a) Flame treatment processes are environmentally harmful. They produce $CO^2$ and $SO^2$ soot. Typically, 20,000 BTU natural gas burners produce about 22 moles of greenhouse gasses per hour ($10^{25}$ molecules per hour). Combustion products from fuels containing carbon also often produce very toxic gasses such as carbon monoxide (CO). Such a method is not environmentally friendly or a green technology.

b) Combustion gas input is used which requires plumbing for delivery and application adding to the cost of set-up and operation.
c) Combustion flame has a narrow area of impact and is therefore its application is non-uniform. To attain the needed uniformity many burners may be needed, adding to the cost and complexity of the process.
d) There is a high potential for explosion due to the presence of combustible gas. Combustion flame is commonly associated with combustion emissions and fire hazards. Employees must be adequately trained and be provided with protective equipment.
e) Flames are inherently energy inefficient with, typically, about 10% of the energy being used in directed flame operations. Most of the energy is not applied to the product.
f) There is a lack of precise control from combustion flames leading to lack of optimization of processes.
g) Flame combustion produces high noise. It also requires the added cost of hearing protection for workers and possible specialized placement and sound insulation of process equipment.
h) There is a continuous requirement for consumables such as reactant gasses leading to increased costs and decreases in profitability. Safety and environmental clean-up costs are incurred.

It is therefore apparent that the current technology is not meeting the above stated goals in an environmentally safe, energy efficient or cost effective manner. With the increase in potentially disastrous effects associated with global warming and the volatile economy, new devices and methods are needed to address these effects, where the present flame treatment technology does not, in regards to improvement of anti-smudging, gripping and shelf-life properties of products and surfaces.

SUMMARY

In accordance with a favored embodiment, a low-ion plasma and superheated steam (LIP™) system for surface treatment and cleaning for the improvement of anti-smudging, gripping and shelf-life of products and surfaces comprises a means to electrically generate low-ion plasma and a means to electrically generate superheated steam. Such low-ion plasma and superheated steam will be applied to the surface of a product in order to cause the enhancement and improvement of the above and other surface and physical properties of bottles and other products made of various materials to, in part, enhance the appearance and life of labels found on the bottles and products. This new method will alleviate problems associated with the current technology including toxic emissions, safety concerns, explosion hazards, pollution, noise, inefficiency, lack of optimization and high costs due to consumables, insurance and specialized training in operation and safety. These and other benefits will become apparent in the following descriptions of the embodiments of the LIP™ system.

DRAWINGS

Figures

Figure 2A:
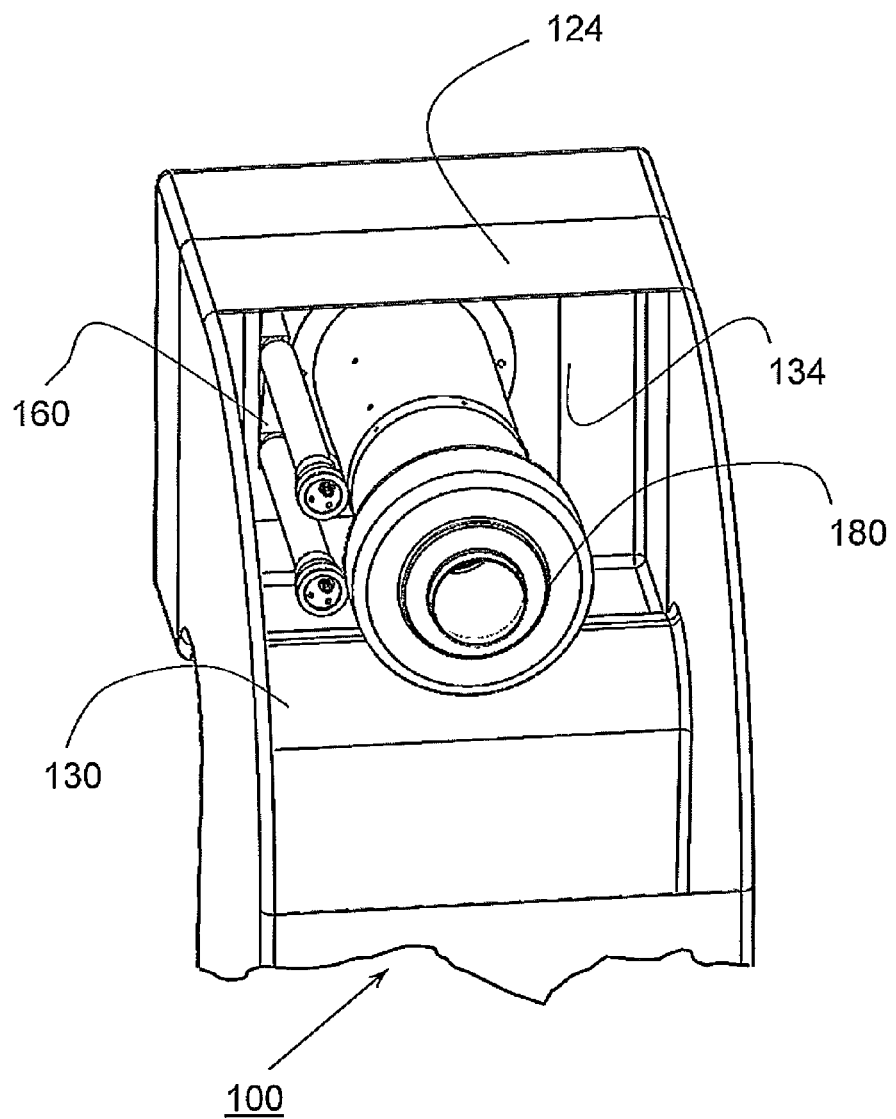
Figure 2B:
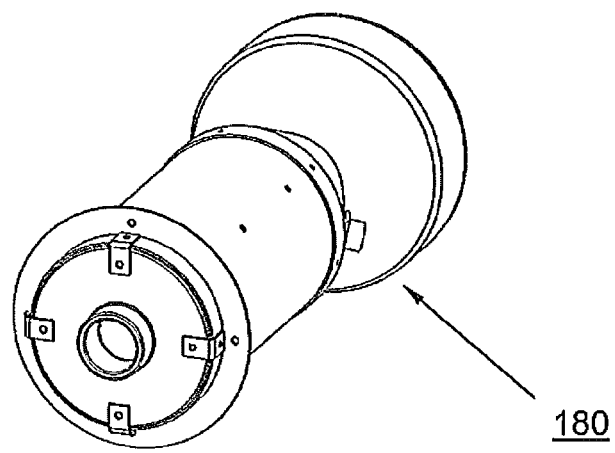
Figure 2C:
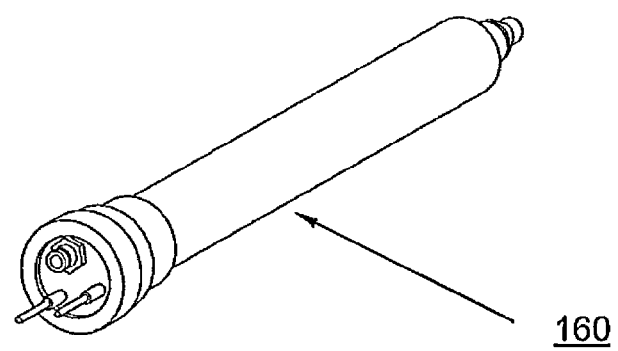
Figure 3:
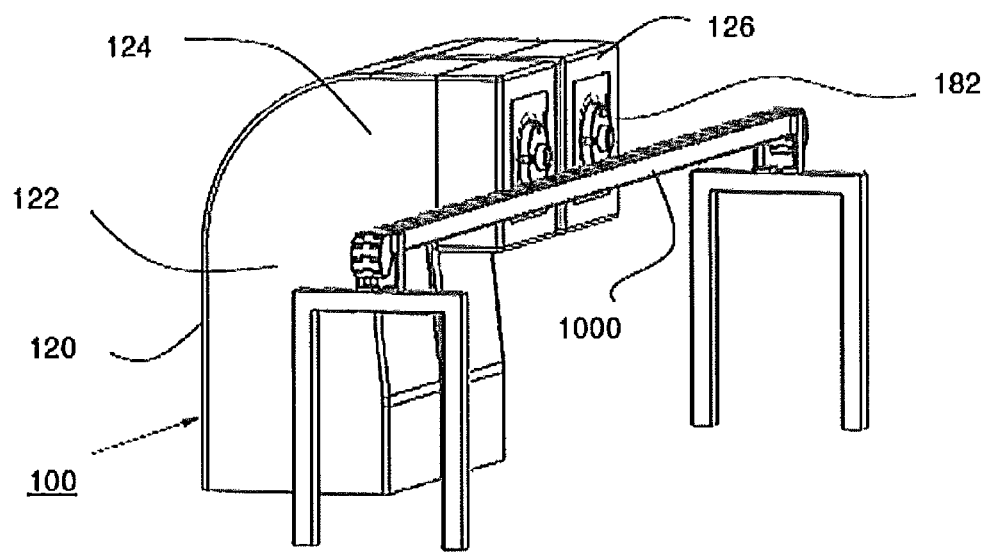
Figure 4:
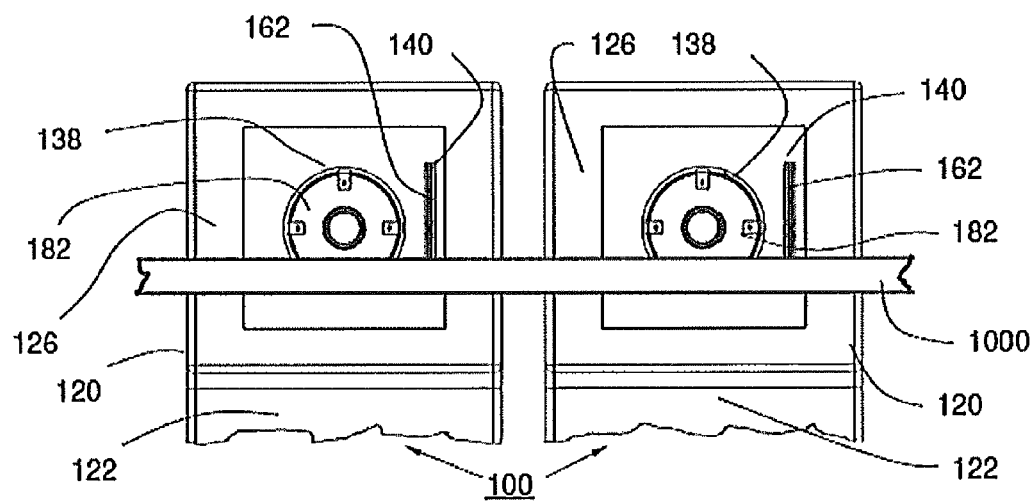
Figure 5:
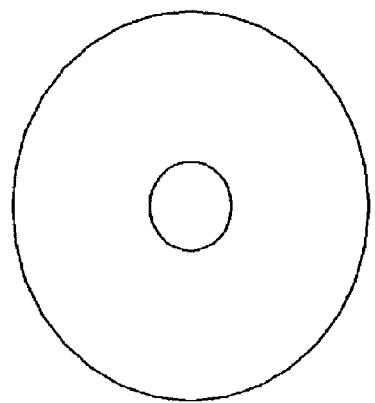
Figure 6:
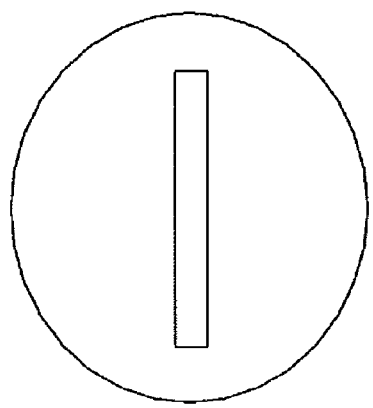
Figure 7:
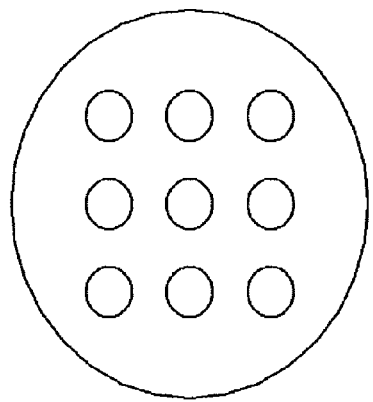
Figure 8:
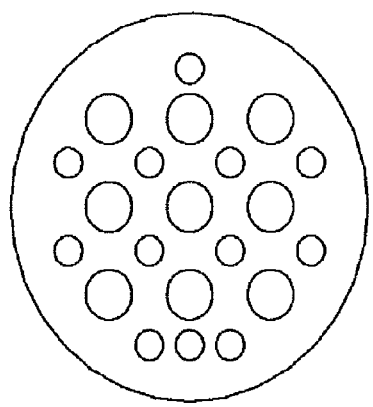
Figure 9:
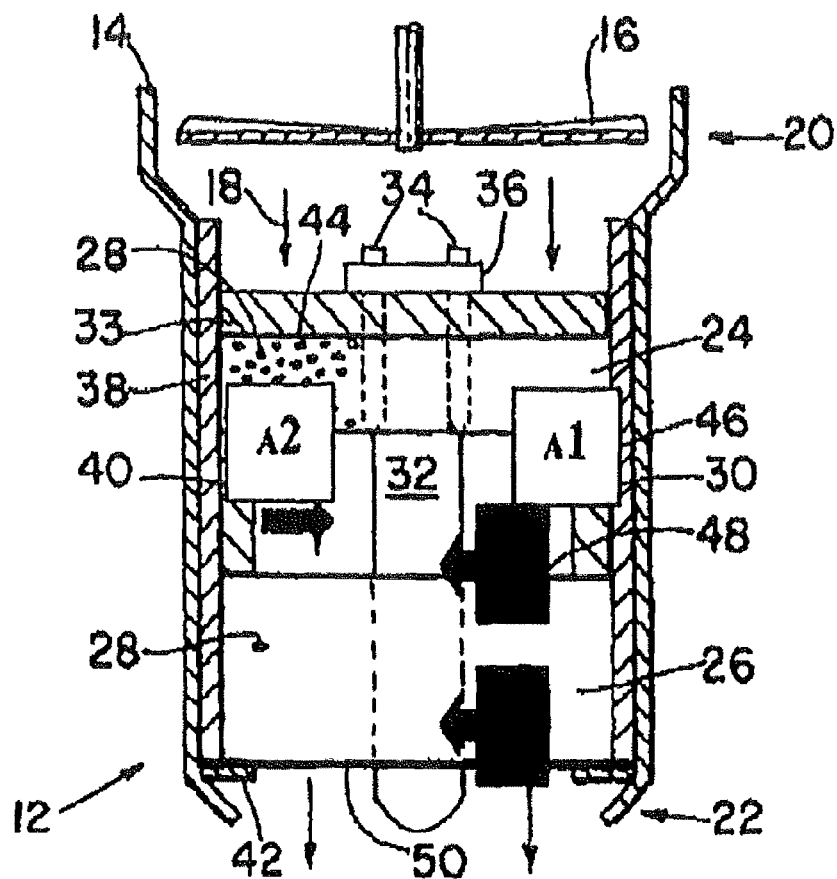
Figure 10:
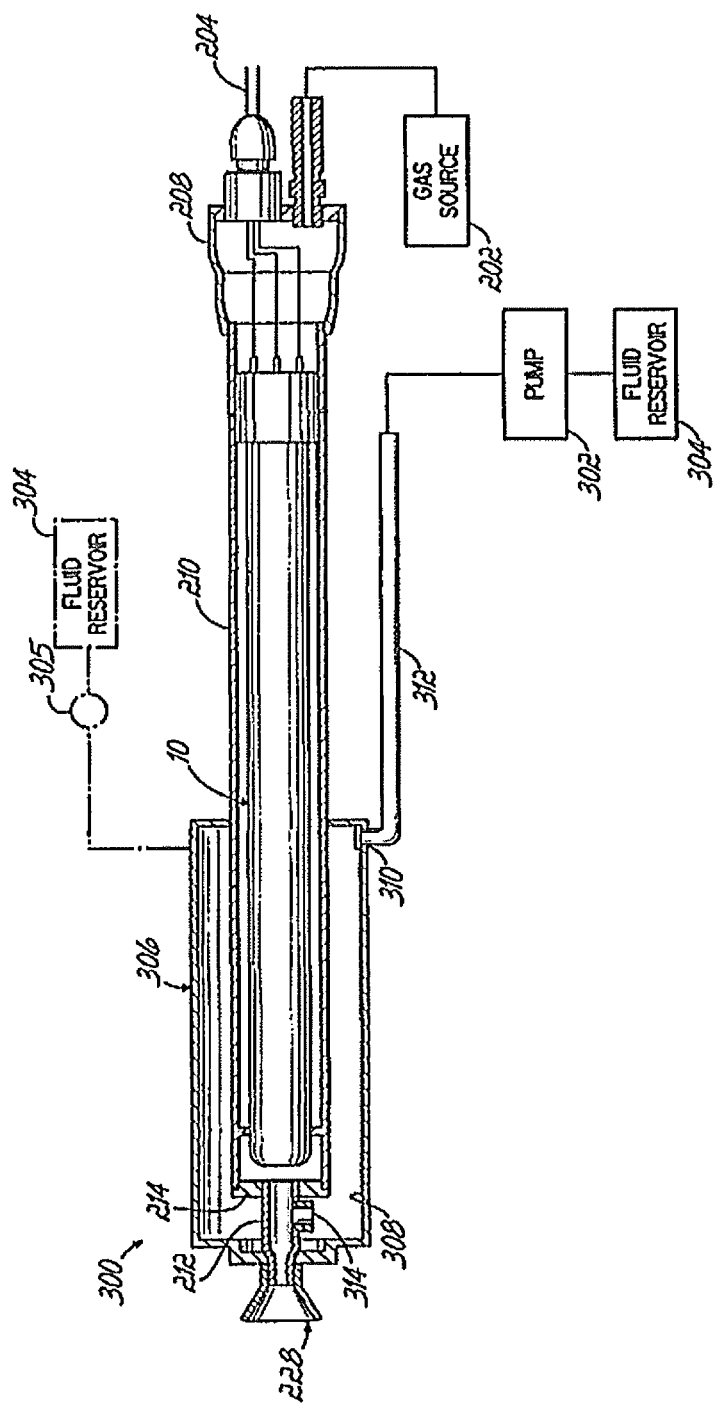

FIG. 1 is a perspective view of the LIP™ system.
FIG. 2(a) is an interior view of the LIP™ system revealing the low-ion plasma generator and superheated steam generation devices contained therein.
FIG. 2(b) is a perspective view of the low-ion plasma generator contained in the LIP™ system.
FIG. 2(c) is a perspective view of an example of a superheated steam generation device contained in the LIP™ system.
FIG. 3 is a perspective view of the LIP™ system and a product conveyor means.
FIG. 4 is a front view of two LIP™ units arranged side by side with a conveyor means.
FIG. 5 is a view of the single-hole nozzle design for the low-ion plasma generator.
FIG. 6 is a view of the slit nozzle design for the low-ion plasma generator.
FIG. 7 is a view of the multi-hole #1 nozzle design for the low-ion plasma generator.
FIG. 8 is a view of the multi-hole #2 nozzle design for the low-ion plasma generator.
FIG. 9 is a cut-away view of an embodiment of a low-ion plasma generator as employed in an embodiment of the present apparatus.
FIG. 10 is a cut-away view of an embodiment of a steam generator as employed in an embodiment of the present apparatus.

It is an object of this invention to provide a device and method for heating a gaseous flow that can impart plasma to the flow. A device for heating a gaseous flow is provided having a first materials, a second materials, and a heat source. The first materials has an inlet side for receiving the gaseous flow, an inner side for discharging the gaseous flow, and a plurality of openings, the openings providing at least one passageway for the inlet side to the inner side. The first materials preferably comprise porous ceramic materials.

The second materials has an inner side for receiving the gaseous flow, an outlet side for discharging the gaseous flow, and a plurality of openings, the openings providing at least one passageway from the inner side to the outlet side. The inner side of the first materials and the inner side of the second material define a gap for providing residence time for gases passing therethrough. Preferably, the second material comprises a porous ceramic materials. It is also preferred that the ratio of the volume of the materials to the volume of the gap is 3. The heat source is in direct or indirect contact with the gaseous flow and provides heat thereto. Preferably, the heat source is an electric heating element.

As shown in FIG. 9, hot plasma blower 12 has a housing comprising a stainless steel shell 14 configured in a substantially cylindrical shape. The blower 12 has an inlet end 20 and an outlet end 22. A fan 16 is disposed near the inlet end 20 for receiving a gaseous flow, depicted by the arrows 18, so that the gaseous flow can be directed through the blower 12 from its inlet end 20 toward its outlet end 22. Fan 18 is preferably driven by an electric motor (not shown).

The gaseous flow 18 to be heated by the blower 12 can comprise a variety of gases or combinations of gases, preferably so that the gases are not chemically reactive when heated to a temperature at which the blower will operate. For example, the gaseous flow 18 can be air that is to be heated and applied to a part or chamber. Also, the gaseous flow can be engine exhaust having particulates that are to be incinerated by the heat of the blower 12. Moreover, although the blower 12 is depicted in its vertical position in FIG. 9, it may be operated in a horizontal manner or at any angle to horizontal.

As shown in FIG. 9, the blower preferably has an insulating liner 38 adjacent the interior surfaces of shell 14 for preventing loss of heat from the interior of the blower. Insulating liner 38 can comprise any insulating material that is physically and chemically stable at the temperature at which the blower is to operate, such as alumina silica fibers, micro quartz fiber and the like.

As is also shown by FIG. 9, the representative embodiment further includes a first material 24 and a second material 26 disposed within the shell 14. The first material 24 includes an inlet side 44 for receiving a gaseous flow (depicted by arrows 18), from the fan 16 and an inner side 46 for discharging the gaseous flow. The second material 26 includes an inner side 48 for receiving the gaseous flow discharged by the first material 24, and an outlet side 50 for discharging this gaseous flow. Preferably, the outer edges of the first and second materials 24 and 26 directly abut the interior surface of the liner 38 such that there is no gap between the liner and the sides of the materials. It is also preferred that the materials 24 and 26 are spaced apart along the longitudinal axis of the blower 12 such that a gap 30 is formed between the two. Spacer 40 can be utilized to maintain the gap 30 between the inner sides 46 and 48 of the first and second materials 24 and 26. The spacer 40 is preferably comprised of an alumina silica cylindrical refractory. Ledge 42 may be utilized to help maintain the materials 24 and 26 at a desired location within the shell 14; the second material 26 can be placed upon the ledge, the spacer 40 may be placed upon the second material, and the first material 24 may be placed upon the spacer. Alternatively, the materials 24 and 26 can be secured to the shell using any manner known in the art such as by bolting, clamping, or the use of high temperature adhesives.

The first material 24 contains a plurality of pores 28 (shown schematically in FIG. 9) that provide at least one passageway for a gaseous flow to travel from the inlet side 44 to the inner side 46. Similarly, the second material 26 also contains a plurality of pores 28 that provide at least one passageway from the inner side 48 to the outlet side 50 of the material. Preferably, the pores 28 within the first material 24 are interconnected so as to provide a plurality of passageways through the material. Similarly, it is preferred that the pores 28 within the second material 26 are interconnected.

The heating element should be made of a resistive material such that it becomes heated as an electric current passes there through as is well known in the art. The element can comprise any number of resistive materials suitable for obtaining a high temperature when an electric current passes there through. For example, the element can comprise a metallic material such as iron or nickel based alloys, iron or nickel based alloys containing aluminum and niobium, nickel aluminide, molybdenum disilicide (or other molybdenum silicides), silicon carbide, nickel chromium alloy, and the like. Conventional U-shaped elements based on molybdenum disilicide, silicon carbide, zirconia, carbon or boron nitride can be heated up to a 1900° C. element temperature. While the heating element is shown as a U-shaped in FIG. 9, it is to be understood that the heating element can comprise any number of shapes and types as are well known in the art. For example, the heating element can have a multiple number of connected U-shaped members or can be provided in a spiral shape or as coil shape or combinations. In one embodiment of this invention we provide for adding tungsten or tungsten bearing compounds to the heating element itself in order to obtain a convective plasma output from the product of this invention.

Furthermore, it is contemplated that hot air could be drawn directly out of the gap as it is simultaneously drawn from the outlet end of the blower or compressor or gas bottle delivering the gas. Moreover, additional fans may be utilized to aid in drawing the air from the blower. It is also contemplated that fins or baffles be utilized within the gap to aid in increasing residence time and raising the temperature of the air output from the fan. In operation, the blower, fan or compressor forces air (or other gas if desired) into the inlet. When the air reaches the first material, it travels from the inlet side, through the pores, and out the outlet side. As noted above, the pores preferably provide a plurality of passageways through which the air may travel. It is even more preferred that the passageways have several turns and twists so that the air travels a "tortuous" path, as is known in the art. As also noted above, the pores within the material are preferably interconnected so that each pore is connected to a plurality of passageways extending from the inlet side to the inner side. The first material has a preferred porosity of 10 pores per inch, each pore having a diameter of about 0.01 inches.

The tortuous path provided by the pores serves at least two functions. First, as air travels the tortuous path, it absorbs the heat retained by the first material and received from the heating element. This preheating of the air helps to prevent the heating elements from cracking, as metallic elements have been known to do when they come in contact with air that is too cool relative to the temperature of the element. The amount of preheating that occurs depends upon the thickness of the material, the porosity of the material, and the size of the pores. The greater the thickness and porosity, the more tortuous the path. The larger the pore size, the less tortuous the path.

The second function of the tortuous path is to help to prevent air from escaping the blower in the opposite direction of the intended flow. Thus, although air that becomes heated will have a tendency to rise from the inner side to the inlet side when the blower is used in the vertical position, the air will have difficulty doing so due to the complex and turbulent flow experienced within the gap upon exiting the material.

Once the air is discharged from the inner side, it enters the gap defined by the first material, the second material and the interior wall of the spacer. The gap can also be described as a cavity, space, or chamber. When air travels through the gap, it receives heat from the element by convection and radiation. The gap provides residence time for the air traveling from inner side of the first material to the inner side of the second material to become heated by the element. It is also believed that a complex combination of turbulent flow, convective flow, and recirculation zones occurring within the gap contribute to the heat imparted to the gas therein. Thus, when the air reaches the inner side of the second material, it has a higher temperature than when it first entered the gap through the inner side of the first material.

Like the first material, the second material also have a number of pores which are preferably interconnected so as to provide a tortuous path from the inner side to the outlet side of the material. It is also preferred that the second material have the same porosity of the first material. As in the first material, the pores of the second material provide a tortuous path for air traveling through the second material and cause the air to rise even higher in temperature as it travels through the material. The element in addition to being disposed within the gap, is preferably also disposed within the second material so as to provide additional heating of the air. The air is finally discharged through the outlet side of the second material and out the outlet end of the blower where is can be utilized by the user. Due to the tortuous paths provided by the materials and, the residence time provided by gap, the air exiting the blower at the outlet end is at a higher temperature than air brought into the blower through the inlet end.

A heater and steam generator 300 in accordance with another embodiment of the invention is illustrated in FIG. 10. A pump 302 may be used to actively supply the working fluid to the heat and steam generator 300 from a fluid reservoir 304.

For example, the pump 302 may be a peristaltic pump having the necessary controls for selectively metering the flow rate of the working fluid (e.g., water) to the heater and steam generator 300. Such peristaltic pumps are commercially available. Other arrangements for supplying the working fluid to the heater and steam generator 300 are also within the scope of the invention. By way of example, a passive arrangement (shown in phantom in FIG. 10) may be utilized wherein the fluid reservoir 304 (e.g., water bag, cartridge, etc.) supplies the working fluid to the heater and steam generator 300 through gravity, for example, or other passive means. In such an embodiment, the reservoir 304 may include appropriate valving 305 (e.g., drip chambers, clips, etc.) for metering the flow of the working fluid to the heater and steam generator 300. Another modification to heat and steam generator 300 is the inclusion of an outer jacket housing 306 that defines a chamber 308 about at least a portion of the casing 210 having an inlet 310 for receiving the working fluid from pump 302 via a suitable conduit 312, and an outlet 314 in fluid communication with delivery tube 212. While the outer jacket housing 306 is shown adjacent the outlet side of the heater and steam generator 300, the housing 306 may be located along other portions of the heater and steam generator.

In operation, the pump 302 or other active or passive supply device supplies the working fluid from the reservoir 304 through conduit 312, through inlet 310, and into the chamber 308 defined by housing 306. The heater 10 heats the casing 210 sufficiently to preheat the working fluid contained in chamber 308 to near or at its saturation temperature (e.g., boiling point). Thus, saturated liquid, saturated vapor or both may be present in chamber 308. Similar to the previous embodiment, the fluid in chamber 308 then flows into the delivery tube 212 where it mixes with the heated gas exiting gas heater 10. The heat from the gas causes the working fluid introduced from chamber 308 to become superheated. In one embodiment, the working fluid is water and the heater and steam generator 300 generates superheated steam. Other working fluids, however, may be used in accordance with aspects of the invention as mentioned above. The end of the delivery tube 212 may include a threaded portion for coupling to various exit nozzles 228 that facilitate directing the superheated vapor-gas mixture (e.g., steam-air mixture) toward various items.

DESCRIPTION

FIGS. 1, 2(a), 2(b), 2(c), 3 and 4—Best Mode

The embodiment of the best mode of the LIP™ system for the improvement of anti-smudging, gripping and shelf-life properties of products and surfaces is illustrated in FIG. 1 (perspective view), FIG. 2(a) (cut-away view), FIG. 2(b) (perspective view of low-ion plasma generator) and FIG. 2(c) (perspective view of superheated steam generator). The LIP™ system 100 is comprised of a housing 120 configured with a vertical section 122 and a horizontal section 124 contiguous with and located above the vertical section 122. An access panel 128 is located at the top of the housing 120 in the horizontal section 124 covering an access opening 130. A cowling 126 is attached to the horizontal section 124 and has an open end 136 on one side and a closed end 134 on the other with the open end 136 being attached to the horizontal section 124. The cowling 126 has a plasma nozzle aperture 138 and a steam nozzle aperture 140 cut through its closed end 134 allowing for placement of the plasma nozzle 182 of the low-ion plasma generator 180 and the steam nozzle 162 of the superheated steam generator 160. In this embodiment the plasma nozzle aperture 138 and the steam nozzle aperture 140 are positioned to allow the plasma nozzle 182 and the steam nozzle 162 to be placed side by side. In this embodiment the low-ion plasma generator 180 is of the type disclosed in U.S. Pat. No. 5,963,709 by Staples and U.S. Pat. No. 6,816,671 by Reddy. The superheated steam generator 160 of the present embodiment is of the types disclosed in U.S. Publication No. 2007/0145038 by Vissa or U.S Publication No. 2010/129157 by Reddy, et al.

A conveyor means 1000 is positioned in a manner to move products in front of the steam nozzle 162 and the plasma nozzle 182 projecting through the closed end 134 of the cowling 126. The speed of the conveyor means is variable can be changed to match requirements in regards to product material type and the property or feature that is in need of alteration by the low-ion plasma and/or superheated steam. The order of the operations (i.e., low-ion plasma, superheated steam) may be changed or one operation may not follow each other right away or one or the other operation may be omitted entirely to achieve desired results. The distance between the conveyor means 1000 and the steam nozzle 162 and the plasma nozzle 182 may be adjusted as well.

Operation

In the present embodiment, a bottle or other product is propelled by the conveyor means 1000 in front of the steam nozzle 162 and plasma nozzle 182 of the LIP™ system 100. The steam nozzle 162 projects superheated steam, which contains ions, produced by the superheated steam generator 160 and the plasma nozzle 182 projects low-ion plasma produced by the low-ion plasma generator 180 on a product or surface. In this manner the bottle or product is passed through both a superheated steam and low-ion plasma stream for a predetermined optimal time for the attainment of the desired improved surface properties. The product may also be passed in front of the plasma nozzle 182 first and then passed in front of the steam nozzle 162. A cooling cycle may also be employed between applications of steam and plasma. It is also contemplated that the product to be treated may be passed only through the plasma stream projected by the low-ion plasma generator 180 or alternatively only through the superheated steam stream of the superheated steam generator 160. The temperature and flow rates of the plasma and steam are variable and controllable as well. The experiments and testing described below present various temperatures, environments and exposure times anticipated and evaluated for different embodiments.

ALTERNATE EMBODIMENTS

FIGS. 5-8 show alternate embodiments of the plasma nozzle 182 of the low-ion plasma generator 180 of the LIP™ system 100. FIG. 5 displays a single-hole plasma nozzle 182(a) while FIG. 6 shows a slit plasma nozzle 182(b). Multiple holes are depicted in FIG. 7 for the multi-hole #1 plasma nozzle 182(c) and in FIG. 8 for the multi-hole #2 plasma nozzle 182(d). These and other anticipated embodiments of the plasma nozzle 182 give great versatility in the direction and intensity of the projection of the plasma stream produced by the low-ion plasma generator 180. The plasma nozzle 182 can be designed to meet any requirement of plasma direction control in regards to the size, shape or material of a product and in accordance with the desired surface and bulk properties. The special design and materials of the nozzles 162 and 182 in some way affect the delivery of a low-ion gas or system. The shapes of the nozzles 162 and 182 can be convex, concave or a combination of the two to achieve diffuse or direct flow for specific uses. Plasma nozzles 182 with single openings found in FIGS. 5 and 6 allow for a more direct and intense plasma stream for smaller products or smaller areas on a larger product. On the other hand, plasma nozzles 182 with multiple holes, such as those in FIGS. 7 and 8, allow for a broader area of plasma application on larger products and surface areas. The plasma nozzles 182 can particularly be adapted to take the shape of an object to be treated, especially if the object has very varying dimensions like a bottle and its mouth. Also anticipated are: plasma nozzles 182 with slits in circular shape around main large hole; steam nozzle 162 to direct steam flow into plasma stream; the use of insulating materials between product and LIP™ system 100 to reduce heat transfer to undesired areas and; the use of shrouds or opposite wall backing to retain heat in the LIP™ system 100. The low-ion and gas can be used to treat metal, inorganic, organic, polymer, composite, solid, semi-solid or liquid surfaces.

By using an ion generation/formation system, even a slight amount of ions, as low at 0.0001%, 0.001%, 0.01%, 0.1% or 1%, as well as large amounts that may be as great as 10% to 100% by volume of a cold or hot gas, can often greatly impact the anti-smudging and/or shininess of surfaces leading to better commercially applicability. Gas, including steam, and all fluid mixtures are contemplated with a small to large concentration of ions. Plasma may be generated from any ion or chemical gas species of $H_2O$, $CO_2$, CO or from complex organic gasses which condense, for instance as glue. The gasses employed could be, for example, air, oxygen and ideal gasses such as helium or argon. Also, the gasses could be combustion products or other plasma gasses. Ions in a gas can result from reactions, flame, heating, plasma generation, electric potential, especially at high frequencies in the ranges of kHz, Ghz and MHz, or electrolytic methods for a gas or fluid. Ions can also be introduced through work based systems (e.g., rubbing of surfaces). Ions can be created by discharges in a gas, vacuum or low pressure gas. Ions are also produced during boiling, evaporating or phase change processes. Ions may be produced from intermediary species that have an ionic nature (for example in catalytic reactions and surface reactions). A combination technique can also be used to produce ions. The main idea is to have a fluid with some ions. All fluids including liquids, droplets, gasses and their mixtures are fully contemplated by the inventors as are fluids containing solid particles and solid ions like colloids, zeolites and other soft and hard fibers including nano-materials in relation to the production of ions.

The inventors have tested surfaces (laser surface reflection and projection) treated by the techniques below for producing ions. It has been found that ions in the fluid provide a great benefit to surfaces by rendering them smudge resistant, better gripping and visually more sharp and attractive. Also found was that the good properties are retained over time, i.e., retained over days, months and possibly years thus improving shelf-life. The shine is retained over many months proving that the technique of having a small amount of ions applied as an anti-corrosive (or anti oxidant) to materials including metals, common plastics, ceramics, nano-materials, paper, PTFE, PTE, styrene, polystyrene, textiles, polyester, ester, polycarbonates, composites and others, as well as products including bottles, storage containers, labels and plastic adhesives is effective in improving product shelf-life. It is anticipated that the surfaces of organic items including fruits, vegetables, meat or even the skin of humans may benefit from the superheated steam, low-ion surface treatment described by the present application. Applicable surface types include transparent, partially transparent, non-transparent and "speckled" surfaces. Tests further indicate that it is more difficult for droplets to fall off ion treated surfaces. This is often an indication that the surface energy is higher for ion treated surfaces. The gripping ability of ion treated surfaces was better, indicating that the coefficient of friction may have been better after such surface treatment. Again, 1% to as little as 0.0001% or less by volume of ions in the fluid seems good enough to achieve these results. Testing indicates that the LIP™ system represents a new technology which allows the use of hot air and gasses to efficiently transfer energy from just above room temperature to 1000° C. containing very low amounts of plasma.

Experiments and Testing

A typical scenario for surface processing for the elimination of flame and the attainment of a better surface that was applied to multiple embodiments is given below:
1. Particular Objective:
 1.1. To replace a flame based process. The flame process suffers from: (1) environment consideration arising from emissions of the combustion products, i.e., $CO^2$, $SO^2$ and soot; (2) has a narrow area impact; (3) possibly suffers from commonly recognized combustion and related fire hazards; (4) has the potential of causing explosions; (5) is energy inefficient; (6) cannot be precisely controlled; (7) makes combustion noise; and (8) is costly because of the requirement for constantly used consumables such as reactant gasses.
2. Specific Goal for the Test:
 The specific goal is the replacement of the multiple flame processing nozzle design on a bottle conveyor line with a safer and more technologically current product.
3. Test Procedure:
 3.1 The printed or labeled faces of bottles are held together by glue which is currently burnt off by the flame.
 3.2 The surfaces of two bottles were treated with a low-ion plasma only and with a low-ion plasma and steam process at speeds exceeding 200 ft/min.
 3.3 The bottles were attached to a linear stage (conveyor means 1000). Velocity and interaction time defined a Ua/2α were measured. This is a standard Fourier number or dimensionless interaction time parameter and can be used to scale a process. a is treatment area or beam size. U is the velocity of movement and α is the thermal diffusivity
4. Equipment:
 4.1 6.5 kW Low-ion plasma generator 180 (For product description see www.mhi-inc.com.)
 4.2 1 kW HGA-S-01 superheated steam generator 160.
 4.3 Bearing Slide (conveyor means 1000)
 4.4 Bottle samples provide from outside MHI
 4.5 LIP™ system 100 of combination energy delivery sources and gasses and different nozzle orientations.
5 Results:
 5.1 The flame may be easily and safely replaced. Both the overall goals and specific goals can me met.
General Test
 1.1 The present application describes a new plasma use and use of steam plasma in various forms in order to obtain a better surface. A better surface is for metal ceramic or polymer (plastic) with improved surface and/or bulk properties including better transparency, hardness, fatigue, wear etc. The low-ion plasma generator 180 was run at 1260° C. at the exit.
 1.2 The platform was about 2" from the front of the low-ion plasma generator 180.
 1.3 The low-ion plasma generator 180 fan speed was set at 1.5 meters per second.

1.4 The HGA-S-01 superheated steam generator 160 was setup to inject steam diagonally into the plasma stream (steam/plasma test only). The diagonal is better than normal but both are possible.

2 Small Volumes and Large Volumes can be Treated with the New Process.

Typical Small Volume Procedure:

2.1 Low-Ion Plasma Generator Test 2.1.1 The low-ion plasma generator 180 will start and heated to the maximum recommended temperature.

2.1.2 The top half of each bottle will be covered with high temperature tape so that the before and after effects of the test can be shown.

2.1.3 The marked bottles will be installed on the bearing slide (conveyor means 1000).

2.1.4 For the plasma test bottle #1 will be used.

2.1.5 High temperature tape will be used to cover the non-tested area of the bottle so that further runs may be completed on the same bottle.

2.1.6 Using the bearing slide (conveyor means 1000) the samples will be moved in front of the plasma stream at a known (estimated) rate of speed. The length of travel will be known and the movement of the bottle will be timed for each run.

2.1.7 Data for the run time, sample, temperature, and any notes will be recorded.

2.2 Steam/Plasma Test 1

2.2.1 The HGA-S-01 superheated steam generator 160 will be heated to 400° C. while running at a flow rate of 20 mL/min.

2.2.2 The sample bottle will be passed in front of the steam flow.

2.2.3 The sample will then be run in front of the low-ion plasma generator 180.

2.3 Steam/Plasma Test 2

2.3.1 The HGA-S-01 superheated steam generator 160 will be heated to 400° C. while running at a flow rate of 20 mL/min.

2.3.2. The sample bottle will be passed in front of the combined steam/plasma steam flow.

3. Data:

3.1. Plasma Testing Data

| Run # | Sample ID | Temp | Time | Notes |
|---|---|---|---|---|
| 1 | Water | 1190 | n/a | Water bottle |
| 2 | 1F | 1260 | 0.840 | Wax was cleared |
| 3 | 1B | 1260 | 1.10 | Center strip was cleared as rest was blanked off with tape |
| 4 | 1B | 1260 | n/a | Wax cleared |

3.2. Steam/Plasma Test 1 Data. Separately treated.

| Run # | Sample ID | Temp | Time | Notes |
|---|---|---|---|---|
| 1 | 2B | 400/1260 | n/a | Wax cleared |

3.3. Steam/Plasma Test 2 Data. Concomitantly treated.

| Run # | Sample ID | Temp | Time | Notes |
|---|---|---|---|---|
| 1 | 2F | 475/1260 | n/a | Wax cleared, no deformation |
| 2 | 3F | 382/1260 | n/a | Wax cleared, no deformation |

3.4. Large Volume procedures involve combinations of power and surface speed. Use of low and large area sources. Alternating steam, plasma and other heat sources like IR, Laser (all wavelengths are considered but some may be more preferable such as excimer lasers or carbon dioxide lasers), electron beam, ion beam and even flame in all combinations and order of treatment and re-treatment etc.

LIP™ Testing Schedule

Procedure #1
LIP 6.5P with 4" Slit Nozzle 182*b*
Procedure #2
LIP 6.5P with 1" Round Nozzle 182*a*
Procedure #3
LIP 6.5P with Multihole Nozzle #1 182*c*
Procedure #4
LIP 6.5P with Multihole Nozzle #1 182*c*
Procedure #5
LIP 6.5P with Multihole Nozzle #1 182*c*
LIP 10D with Multihole Nozzle #1 182*c*
2 LIP units side-by-side spaced ~8" apart
Procedure #6
LIP 6.5P with Multihole Nozzle #2 182*d*
LIP 10D with Multihole Nozzle #2 182*d*
2 LIP units side-by-side spaced ~¼" apart
Procedure #7
LIP 6.5P with Multihole Nozzle #2+(×2) 1 kW LTA units w/4" knife
LIP 10D with Multihole Nozzle #2+(×2) 1 kW LTA units w/4" knife
2 LIP units side-by-side spaced~¼" apart
Procedure #8
LIP 6.5P with Multihole Nozzle #2+1 kW LTA units w/4" knife+1 kW TTA steam unit w/4" knife
LIP 10D with Multihole Nozzle #2+(×2) 1 kW LTA units w/4" knife
2 LIP units side-by-side spaced~¼" apart Further embodiments concerning the order of application of the superheated steam and low-ion plasma streams anticipate increased versatility. The superheated stream may be applied to a product before, after or simultaneously to the application of the low-ion plasma. In some cases the low-ion plasma or superheated steam may be applied by themselves to achieve desired results. If desired, the product may be allowed to cool after the application of the plasma or steam and before the application of the other. Typically, the low-ion can be generated with non-combustible air, but if needed, could be generated with a variety of other gasses. The type of product to be treated and the surface or bulk property to be augmented can determine which of these and other embodiments is to be employed. Units of the LIP™ system 100 may be used singly, side-by-side or facing each other and with or without a conveyor means 1000 depending on the needs of the customer. In general, the LIP™ system 100 is designed for continuous short-time exposure of forced convective heat, utilizing ions in a flowing gas. The major heat transfer mechanisms are ion recombination and forced convection while a minor heat transfer mechanism is radiative as apposed to the co-filed PCT patent application no. PCT/US10/49418 entitled "Clean Green Electric Protectors For Materials" which relies predominately on radiative heat and little on convection for heat transfer. The forced convection is of a hot gas with temperatures above 100° C., 200° C., 500° C., 750° C., 1000° C. or 1250° C. Ions are supplied by low-ion plasma and all sources and mechanisms of heat are directed with velocity. Also, the forced convection acts to enhance the affects of the low-ion plasma.

Advantages

While fully realizing there are many other advantages provided by the LIP™, from the description above, a number of advantages of the embodiments of the LIP™ system over the use of open flame become evident including:

a) No toxic emissions or greenhouse gasses are produced. Device uses only air input requiring no other gasses and, as a result, no venting is needed as only air is released into the environment. The replacement of a combustion flame with an "air flame" is more energy efficient, improves productivity and is safer, thereby improving the insurance profile of the user.

b) The LIP™ system has a very wide area flexibility which increases line speed dramatically.

c) There is no possibility of explosion from the inlet source with the LIP™ system since no combustion gasses are involved. LIP™ systems can be integrated with over-temperature controls leading to less monitoring and labor savings.

d) The LIP™ system is over 90% efficient. Energy savings depend on the user's objectives and the total power replaced, but as an example, a 30 kW flame is generally replaced by 6 kW of clean electric for select operations.

e) Precise control is available to fully optimize all processes and provides for safety controls such as over-temperature cut-off. Directional application of stream of gas and low-ion plasma is possible.

f) Quiet operation requiring no hearing protection.

g) LIP™ systems offer great savings in many ways. The system uses only air and electricity rather than costly consumables including combustible gas. Insurance premiums may be influenced in a positive many due to increases in safety provided by the LIP™ system including no flame, no combustible gas and low noise output. Allows a user to differentiate itself from the competition by allowing the user to stress its use of green technology. Depending on the application, the LIP™ system is often less expensive in general that conventional flame technology.

h) The use of low-ion plasma overcomes the problems of excessive heat generated by the recombination of high percentages of ions in plasma. Fewer ions to be recombined lead to less heat allowing for uses where too much heat created by too many ions, for example, would cause melting and be destructive.

i) The heat generated by low-ion plasma is controllable and, in effect the low percentage of ions beneficially catalyzes reactions on a surface or in a gas-ion mixture.

The LIP™ system provides even further advantages over open flame and other methods due to the great flexibility it provides. Though the preferred embodiment calls for the use of low-ion plasma, the LIP™ system can perform its function of improving anti-smudging, better grip-ability and improved shelf life with plasma with percentages of ions from 0.0001% to 100% by volume. Further flexibility is provided by the fact that meeting the stated goals of product improvement do not depend on the order in which the superheated steam and low-ion plasma are applied. Studies at MHI Inc. have revealed that the LIP™ system is effective regardless of the order in which the steam or plasma is applied and is even effective if a product is subjected to only one. The system can be employed for direct flow or at any angle required. It may be used for material heat treating in complex situations where the surface to be heated is out of sight allowing for treatment without expensive and time consuming disassembly.

It is anticipated that the improvements that the low-ion plasma and superheated steam LIP™ system provides may be employed on a wide and diverse array of applications encompassing: engine parts, printing on plastic food containers, energy-efficient window coatings, safe drinking water, voice and data communications components, waste processing, coatings and films, electronic computer chips and integrated circuits, advanced materials (e.g., ceramics), high-efficiency lighting, plasma enhanced chemistry, surface finishing and cleaning, processing of plastics, gas treatment, spraying of materials/nano crystals, glass heating and cutting, aluminum, nano-structures, chemical analysis, semiconductor production for computers, changing surface polarity or influencing transparency, modification of chemical compounds, hydrogen, melting and vaporization, boilers, energy systems (including nuclear, combustion and equipment), televisions and electronics, standard metallurgical processing at improved efficiencies and ease of use, and microbial reduction Improved surface and/or bulk properties, e.g., hardness, fatigue and wear, will be imparted to metal, ceramic and polymer (plastic) materials by the LIP™ system.

The above descriptions provide examples of specifics of possible embodiments of the application and should not be used to limit the scope of all possible embodiments. Thus the scope of the embodiments should not be limited by the examples and descriptions given, but should be determined from the claims and their legal equivalents.

We claim:

1. A device for the improvement of anti-smudging, gripping and shelf-life properties of products and surfaces comprising a means to electrically generate and apply a low-ion stream to products and surfaces, wherein the means to electrically generate and apply the low-ion stream comprises a heater capable of heating a gaseous flow to a temperature sufficient to produce ions, wherein the gaseous flow is heated by at least one electrically powered heating element, wherein the device has an aperture through which the low-ion stream exits and wherein the device is positioned in a manner to project the low-ion stream on to products and surfaces.

2. The device of claim 1 wherein the low-ion stream is comprised of ions in a hot gas having a temperature greater than 100° C. such that the ions transfer to the surface of the products.

3. The device of claim 1 further comprising a conveyor means moveably positioned in front of the aperture of the heater of the means to electrically generate and apply the low-ion stream to the products and the surfaces in such a manner as to transport the products and the surfaces across the low-ion stream.

4. The device of claim 3 wherein the conveyor means has variable speed control.

5. The device of claim 1 wherein the heater of the means to electrically generate and apply the low-ion stream to the products and the surfaces comprises an electrically powered plasma generator, wherein the heater comprises; a first material having an inlet side for receiving the gaseous flow, an inner side for discharging the gaseous flow, and a plurality of openings, the openings providing at least one passageway from the inlet side to the inner side, a second material having an inner side for receiving the gaseous flow, an outlet side for discharging the gaseous flow, and a plurality of openings, the openings providing at least one passageway from the inner side to the outlet side, wherein the inner side of the first material and the inner side of the second material define a gap therebetween and wherein the at least one heating element is in heat transfer relation with the gaseous flow for heating the gaseous flow.

6. The device of claim 5 wherein the electrically powered low-ion plasma generator includes a plasma nozzle for directional application of plasma.

7. The device of claim 6 wherein the plasma nozzle includes a single hole for exit of the plasma.

8. The device of claim 6 wherein the plasma nozzle includes a plurality of holes for exit of the plasma.

9. The device of claim 1 wherein the means to electrically generate and apply the low-ion plasma to the products and the surfaces comprises an electrically powered superheated steam generator, wherein the steam generator comprises a fluid reservoir for supplying a working fluid to the gaseous flow which as been heated by the at least one electrically powered heating element thereby producing a superheated vapor.

10. The device of claim 9 wherein the superheated steam generator has a steam nozzle for directional application of superheated steam.

11. A device for the improvement of anti-smudging, gripping and shelf-life properties of products and surfaces comprising a low-ion plasma generator and a superheated steam generator, wherein the plasma generator and the superheated steam generator electrically generate and apply a low-ion stream, the plasma generator and the superheated steam generator each comprising a heater which heats a gaseous flow to a temperature sufficient to produce ions, wherein the gaseous flow is heated by at least one electrically powered heating element, wherein each has an aperture through which the low-ion stream exits and wherein each is positioned in a manner to project the low-ion stream individually, simultaneously or sequentially to products and surfaces.

12. The device of claim 11 further comprising a conveyor means moveably positioned in front of the low-ion plasma generator and the superheated steam generator in such a manner as to transport the products and the surfaces across a plasma stream.

13. The device of claim 11 further comprising a housing, the housing having a horizontal section, a vertical section and a cowling with a closed end and an open end, the open end of the cowling being attached to the horizontal section of the housing, the horizontal section and the cowling containing the low-ion plasma generator and the superheated steam generator.

14. The device of claim 13 wherein the closed end of the cowling includes a plasma nozzle aperture through which the plasma nozzle protrudes and a steam nozzle aperture through which the steam nozzle protrudes.

* * * * *